UNITED STATES PATENT OFFICE.

HARRY W. CLAYTON, OF ODIN, ILLINOIS.

PAINT COMPOSITION.

SPECIFICATION forming part of Letters Patent No. 417,666, dated December 17, 1889.

Application filed May 24, 1889. Serial No. 311,996. (Specimens.)

*To all whom it may concern:*

Be it known that I, HARRY W. CLAYTON, a citizen of the United States, residing at Odin, in the county of Marion and State of Illinois, have invented a new and useful Paint Composition, of which the following is a specification.

This invention has relation to a liquid solution to be added to paints, oils, sizes, and wood fillers or primers, whereby the same are rendered absolutely fire-proof. Among the objects of the invention are to provide a liquid that may be applied, either alone or in conjunction with a sizing, ordinary paint, for either inside or outside work, to oil paintings, and, in fact, in any other place where such a solution would be of advantage, and may be easily mixed with any other liquid.

The invention consists in the following ingredients: To about six ounces of blue vitriol are added two ounces of copperas, six ounces sal-ammoniac, two ounces of sal-soda, six ounces of alum, three ounces of sulphate of zinc, three ounces of sugar of lead, four ounces of sulphate of magnesia, three ounces of chloride of zinc, two ounces of borax, one pound of quicklime, and one of common salt. The acid is destroyed by the zinc, and the entire ingredients thoroughly ground and dissolved in one and a half gallon of water, and to this is added three gallons of oil, which latter may be either mineral, vegetable, linseed, cotton-seed, or golden machine oil, or turpentine, separate or together. This forms the compound, and to the same may be added the necessary pigments of any color, and the same will form a fire-proof paint that I have subjected to tests of 300° Fahrenheit without producing combustion.

For use in distemper-sizing, add one pound of glue dissolved in a quart of water, and omit the oils and pigments.

The following are a few of the advantages accruing from the use of my compound, viz: The same can be used with oils of all kinds, turpentine, &c., with whatever pigments are mixed for manufacturing paint—namely, lead, iron, earths, zincs, or other metallics. My compound produces a fluid that can be used as a fire-proof sizing in distemper—namely, glues, white of eggs, beer, or other albumen material. My compound can also be used in oil sizing. When used in the form of sizes applied to wood, it can hardly be detected, thus enabling natural woods to be finished with a fair finish or wood-polish, which at the same time renders them fire-proof.

The compound herein described is also colorless, and may therefore be used on floors.

A paint mixed with my compound when dry has a hard flinty surface, sealing the pores of the wood and holding the fire-proof qualities from evaporation, will not crack, blister, dust, or peel, and wears longer than paints not provided with the compound.

I will herein state that I do not limit my invention in mixing the same with any particular pigment, oil, or liquid, or to any manner of applying or use, or to the exact proportions herein specified.

Having described my compound, what I claim is—

The herein-described compound adapted for mixing with liquids, oils, or dry pigments, or for use alone, the same consisting of blue vitriol, copperas, sal-ammoniac, sal-soda, alum, sulphate of zinc, sugar of lead, sulphate of magnesia, chloride of zinc, borax, quicklime, and common salt, the above ground and dissolved in water and combined in substantially the proportions specified.

In testimony that I claim the foregoing as my own I have hereto affixed my signature in presence of two witnesses.

HARRY W. CLAYTON.

Witnesses:
M. A. RUSH,
F. J. BARBEE.